United States Patent [19]

Brauninger

[11] Patent Number: 4,819,173

[45] Date of Patent: Apr. 4, 1989

[54] SYSTEM FOR PREVENTING EXCESSIVE REPETITION OF INTERRUPT PROGRAMS IN A MICROCOMPUTER

[75] Inventor: Jürgen Brauninger, Stuttgart, Fed. Rep. of Germany

[73] Assignee: Robert Bosch GMBH, Stuttgart, Fed. Rep. of Germany

[21] Appl. No.: 939,703

[22] Filed: Dec. 9, 1986

[30] Foreign Application Priority Data

Dec. 13, 1985 [DE] Fed. Rep. of Germany ....... 3544079

[51] Int. Cl.$^4$ .......................... G06F 9/22; G06F 15/00
[52] U.S. Cl. ........................... 364/431.07; 364/431.11; 364/551.01; 377/26
[58] Field of Search ...................... 364/431.07, 431.08, 364/431.11, 431.06, 551; 377/26

[56] References Cited

U.S. PATENT DOCUMENTS

| 4,204,256 | 5/1980 | Klotzner | 364/431 |
|---|---|---|---|
| 4,282,373 | 8/1981 | Imai et al. | 364/431.11 |
| 4,348,727 | 9/1982 | Kobayashi et al. | 364/431.06 |
| 4,355,360 | 10/1982 | Asano et al. | 364/431.11 |
| 4,482,962 | 11/1984 | Amano et al. | 364/431.11 |
| 4,512,019 | 4/1985 | Bodig et al. | 371/12 |
| 4,525,309 | 6/1985 | Nitschke | 37/12 |
| 4,525,783 | 6/1985 | Pischke et al. | 364/431.11 |
| 4,554,634 | 11/1985 | Shinodu | 364/431.07 |
| 4,562,544 | 12/1985 | Bonitz et al. | 364/431 |

Primary Examiner—Parshotam S. Lall
Assistant Examiner—Ellis B. Ramirez
Attorney, Agent, or Firm—Frishauf, Holtz Goodman & Woodward

[57] ABSTRACT

In an automotive engine control microcomputer the frequency of interrupt programs initiated by a pulse from an engine speed tachogenerator is prevented from being excessive as a result of loose connections or other malfunctions or distrubances by blocking the access of tachogenerator pulses to the interrupt port of the microcomputer for a predetermined interval following a successful interrupt from that source. If another signal that would produce an interrupt from that source is received during that interval, a circumstance indicative of probable malfunction, the blocking of interrupts from that source is continued for another interval of the same length.

8 Claims, 2 Drawing Sheets

SYSTEM FOR PREVENTING EXCESSIVE REPETITION OF INTERRUPT PROGRAMS IN A MICROCOMPUTER

This invention concerns provision, in a microcomputer serving particular machinery such as an automobile engine, for preventing unacceptable delay in the main program of the computer resulting from unduly repeated initiation of an interrupt program.

In computer-based control apparatus for devices such as an automobile engine, for example, signals from sources such as a rotary speed transducer supplying an electric wave or pulse frequency signal relating to the speed of the engine or of the shaft thereof are evaluated by the measurement of the duration of the signal. As a rule this is done by initiating interruptions of the program of a microcomputer by so called interrupt signals produced at the frequency of the transducer signal and provided through an evaluation circuit. The normal running of the main program of the microcomputer is thereby interrupted and the performance of a brief interrupt program is initiated in which the frequency of the initiating signals or the corresponding period duration can be obtained from the condition of a counter. At the end of the interrupt program the normal program running is resumed.

It is generally assured that in the case of correct interrupt signals the interrupt frequency is small enough so that the interruptions of the normal program running do not lead to an unacceptably long running time for the main program. If there are disturbances in transducer or circuit operations, such as may result from intermittent contacts or loose connections, however, the frequency of the transducer output signal may become unduly high, resulting in frequent bunching of interrupts and unacceptably long duration of normal program running because of the excessively frequent occurrence of interruptions. In such cases there can even be new interrupt initiations before the end of an interrupt program already under way, so that a new interrupt program will start just as soon as the one under way terminates. In the later case, the normal program can hardly proceed any longer. In certain microcomputer configurations there is even the risk that a running interrupt program will be interrupted by further interrupts, so that a multiplicity of jump-back addresses will be stored with every interrupt, producing an overflow of the available storage capacity. Such an event produces an utterly uncontrollable behavior of the microcomputer.

Emergency functions or routines are often provided for the case of microcomputer failure, but even these become ineffective when a defective transducer signal produces an excessive number of interrupt requirements in conventional microcomputer systems.

SUMMARY OF THE INVENTION

It is an object of this invention to provide a method and means of eliminating excess interrupts from a particular interrupt source in a microcomputer for protection of such programs of the microcomputer that may be interrupted thereby.

Briefly, logic is provided in the microcomputer by an appropriate combination of hardware and software for blocking interrupt signals from a source of interrupt signals and thereby denying them access to the interrupt function of a microcomputer during a predetermined time interval after an interrupt signal from the same source has appeared. This has the advantage of preventing a multiplicity of interrupt requirements being generated by a malfunction. Furthermore, the period of immunity to further interrupts from the same source is at least long enough for performing emergency operations of the computer. The duration of the immunity interval can be timed by a time counter which is started at every first interrupt signal. Then, at the end of the time interval counted out by the time counter if during that interval another interrupt request from the same source has appeared, the time counter will be immediately started again to continue the protection of the computer. Another solution to the problem can consist essentially in periodically checking in intervals of constant size, whether an interrupt request is received, if so, a blockage of further interrupts is established for the remainder of the time interval. If another request for interrupt is received during such a blockage, the blockage remains in place during the next time interval also.

BRIEF DESCRIPTIONS OF THE DRAWINGS

The invention is further described by way of illustrative example with reference to the annexed drawing, in which.

DESCRIPTION OF THE ILLUSTRATED EMBODIMENTS

Figure 1:
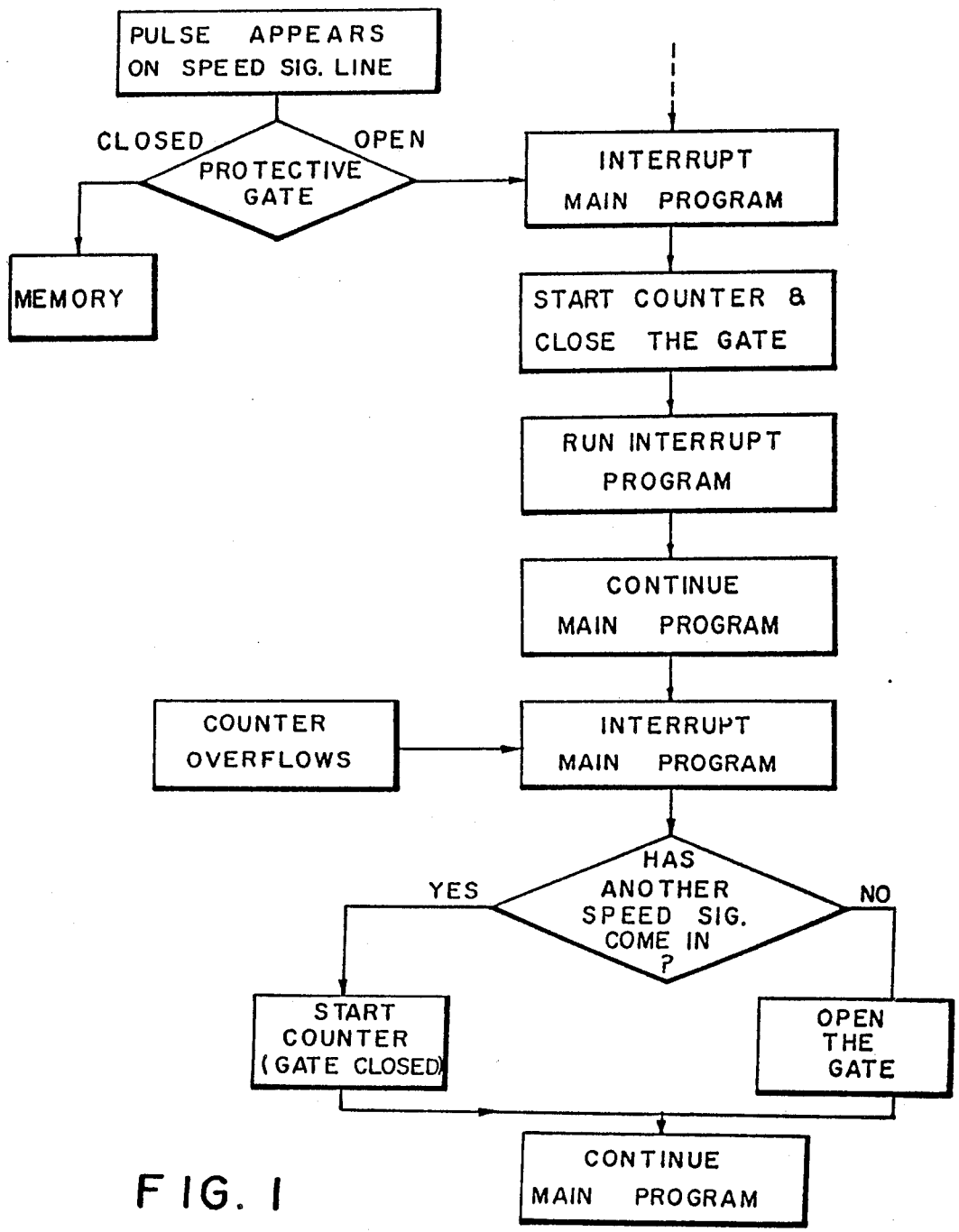
FIG. 1 is a flow diagram of the operation of a system of the invention.

It may be assumed, for example, that in response to an interrupt, the microcomputer 1 is required to measure the frequency of a speed measurement signal. As shown by the flow diagram of FIG. 1, when such an interrupt arrives, the first consequence is to block subsequent interrupts, either generally or only with respect to the same source of interrupt signals, when there are many such sources. The measurement signal requiring a frequency measurement can be a signal representing an automobile crank shaft speed $n_1$ or a signal representing an auxiliary speed value $n_2$.

With the establishment of a blockage of further interrupts a counter is started and the interrupt program responsive to the interrupt signal is carried out by the computer 1. After a time interval determined by the time counter, it is checked whether during the counting time a further interrupt request has been received. If one was received, that interrupt request is disregarded and the time counter is started anew. On the other hand, if during the count-out interval of the timing counter, no further interrupt was received, the interrupt blockage is removed. An interrupt request thereafter appearing can then again cause the interrupt program for frequency determination of a signal to be performed, for example, for one of the two rotary speed signals in $n_1$, $n_2$ identified in FIG. 2. It is to be understood that logic can be performed either by dedicated hardware, associated with or built into the computer, or by programming of the capability of the computer itself. The input 10 of FIG. 3 on which the signal n arrives to initiate an interrupt program leads first to a AND gate 11 before proceeding through the connection 12 to the interrupt port of the microcomputer. The AND gate is normally open, which is to say that there is normally no signal on the connection 13 to its other negated input. When the signal n reaches the connection 12 it also, through a branch connection 14, goes to the set input S of the flip flop 15. While the flip flop 15 is set, a signal appears at its output 1 which enables the counter 20 to count pulses provided by the clock pulse generator 21 on the connection 22. The signal at the output 1 of the flip flop 15 also appears on the connection 13 to block the AND gate 11.

From the time the counter is started by being thus enabled until it overflows no further interrupt signal can be produced from a pulse of the signals n. This period may be substantially longer than the interval necessary for execution of the interrupt program called into play by an interrupt signal on the connection 12. It should be at least long enough for the execution of an emergency operation program after the completion of the interrupt program. It may be still longer in the interest of giving the main program of the microcomputer an assured amount of time for its running comparable to what may be expected during the maximum bunching signals n in normal operation undisturbed by malfunction.

When the counter 20 overflows a signal on the connection 25 is furnished to the reset terminal R of the flip flop 15, disabling the counter 20 and opening the AND gate 11 unless a new signal appears on the connection 14. The AND gate 27 prevents resetting in the later case.

While the flip flop 15 is set, the AND gate 30 can be opened by another signal from the source n which would have produced an interrupt signal if the AND gate 11 had not been blocked. Such a signal results in setting the flip flop 32. Consequently, when the counter 20 overflows while the flip flop 32 produces a signal on the connection 33 which signifies that another interrupt was received from the source 10 during the interval counted out by the counter 20, the resetting of the flip flop 15 is inhibited by the AND gate 27. After a short delay provided by the circuit element 35 the flip flop 32 is reset and the counter continues to count another interval.

A similar short delay provided by the element 36 may be used to provide further assurance that no remnant of the signal n which produced an interrupt in the line 12 would be able to set the flip flop 32. The flow diagram of FIG. 1 and the logic diagram of FIG. 3 are sufficient to define the implementation of the invention by programming the microcomputer 1 shown in FIG. 2.

Figure 2:
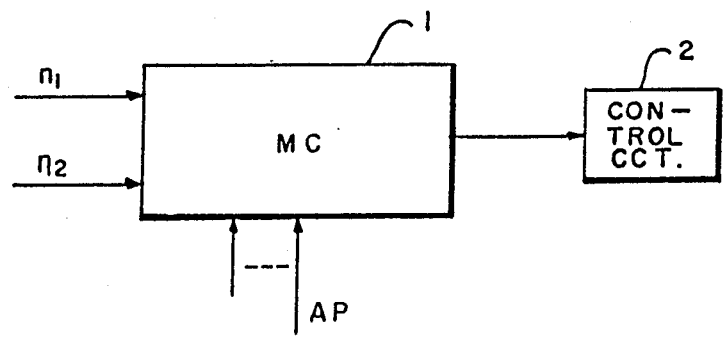
FIG. 2 is a simplified circuit block diagram of a system according to the invention.
Figure 3:
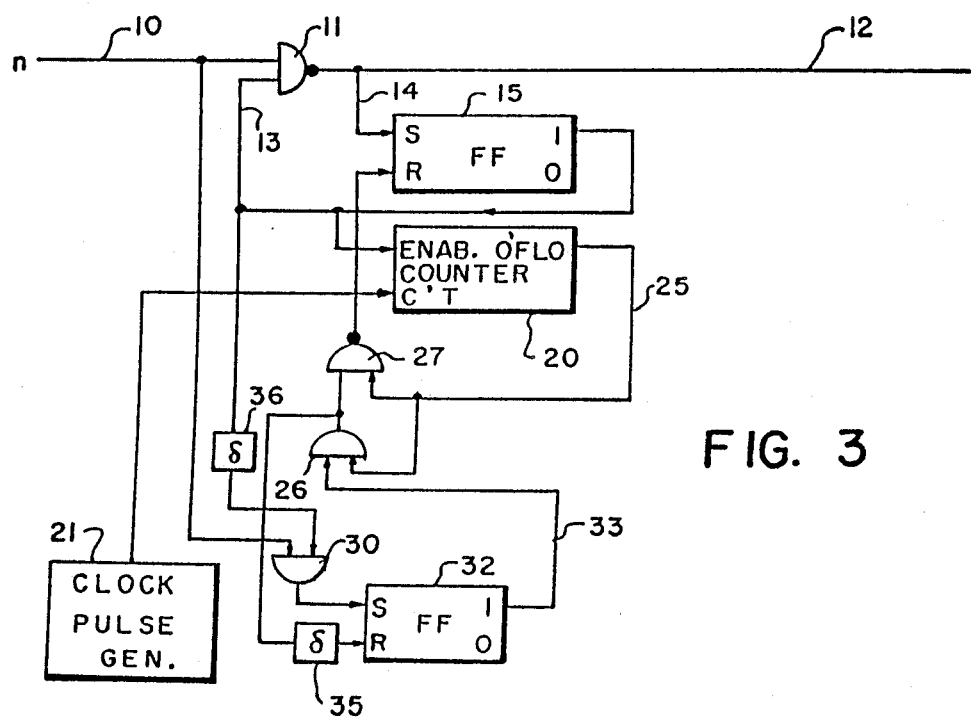
FIG. 3 is a logic diagram representing circuit hardware and/or software in the microcomputer of FIG. 2 for protecting the main program against excessive interrupts from sources subject to malfunction.

As further shown in FIG. 2, the microcomputer 1 can be supplied with additional operation perameters of an engine when the microcomputer controls the operation of a vehicle engine. Thus, as shown in FIG. 1 a signal AP representative of the accelerator pedal position may be supplied to the microcomputer 1 as well as other operating parameter signals not individually designated. The microcomputer is shown having an output to a control circuit 2 controlling ignition timing. Of course a microcomputer in the case of a vehicular installation could also or instead control engine fuel injection and/or various other operating magnitudes that may need to be controlled in accordance with engine speed and other engine operating parameters.

Although the invention has been described with reference to a particular illustrative example, it will be understood that variations and modifications are possible within the inventive concept.

I claim:

1. Microcomputer for control of machinery having a main program and at least one interrupt program responsive to a source of cyclic signals derived from said machinery, for interrupting said main program and performing an interrupt program consisting of a measurement or other relatively brief processing, said microcomputer comprising:

access control means responsive to a signal from said source of cyclic signals for effectively blocking or giving access of a signal from said source to an interrupt input of said microcomputer for interrupting said main program and obtaining performance of an interrupt program pertaining to said cyclic signal from said source, being responsive also to an access control signal for selective blocking or access giving, and timing means responsive to any signal from said source which is not blocked by said access control means for producing an access control signal for thereafter blocking said signals from said source by said access control means for an interval of a predetermined fixed duration pertaining to said cyclic signals from said source and measured by said timing means, which exceeds the magnitude of an interval necessary for performance of said interrupt program by at least the magnitude of an interval necessary for performing emergency programs in the event of detection of an emergency condition by said microcomputer, said access control signal, except during an interval of said predetermined duration timed by said timing means, being of a nature for causing said access control means to give access to said interrupt input.

2. Microcomputer according to claim 1, wherein said machinery is an automotive vehicle engine and said interrupt program is a program for determining an operating rotary speed of said engine which exists at the instant of an interrupt-producing signal which is given access to said interrupt input by said access control means.

3. Microcomputer according to claim 1, wherein said computer includes clock pulse generating means and said timing means includes a counter for counting pulses derived from an output of said clock pulse generating means.

4. Microcomputer according to claim 3, wherein said machinery is an automotive vehicle engine and said interrupt program is a program for determining an operating rotary speed of said engine which exists at the instant of an interrupt-producing signal which is given or blocked from access to said interrupt input by said access control means.

5. Microcomputer according to claim 1 further comprising:

means for detecting the presence of a signal from said source while said access control means are blocked by said timing means, and means responsive to detection of a said signal from said source by said detecting means for causing said timing means to block said access control means for another timed interval of said fixed duration following the end of the interval timed by said timing means during which said signal from said source was detected by said timing means.

6. Microcomputer according to claim 5, wherein said machinery is an automotive vehicle engine and said interrupt program is a program for determining an operating rotary speed of said engine which exists at the instant of an interrupt-producing signal which is given or blocked from access to said interrupt input by said access control means.

7. Microcomputer according to claim 5, wherein said computer includes clock pulse generating means and said timing means includes a counter for counting pulses derived from an output of said clock pulse generating means.

8. Microcomputer according to claim 7, wherein said machinery is an automotive vehicle engine and said interrupt program is a program for determining an operating rotary speed of said engine which exists at the instant of an interrupt-producing signal which is given or blocked from access to said interrupt input by operation of said access control means.

* * * * *